Patented Aug. 3, 1954

2,685,606

UNITED STATES PATENT OFFICE 2,685,606

PREPARATION OF HALOGENATED OLEFINES

Jared W. Clark, Charleston, W. Va., assignor to Union Carbide and Carbon Corporation, a corporation of New York No Drawing. Application February 25, 1953,
Serial No. 338,897

10 Claims. (Cl. 260—653)

This improvement relates to halogenated olefines. More particularly it is concerned with an improved process wherein chlorotrifluoroethylene is made by the removal of chlorine from 1,1,2-trichloro-1,2,2-trifluoroethane in the presence of hydrogen and over a nickel catalyst.

It is known (locke et al. J. A. C. S. (1934), vol. 56, 1726) that polychlorofluoroalkanes can be dechlorinated with zinc to yield chlorofluoroalkenes. The reaction appears to be generally applicable to the dehalogenation of compounds having one or more chlorine or bromine atoms on each of adjacent carbon atoms. It constitutes, also, a method for preferentially removing chlorine and bromine atoms from compounds of this type in which fluorine is additionally present. The chlorine or bromine atoms are removed in pairs, with one atom of zinc being required to effect the removal of each pair. Thus, the dechlorination of trichlorotrifluoroethane, for instance, by this process results in the production of by-product zinc chloride in an amount which is 1.2 times the weight of the chlorotrifluoroethylene that is desired. This zinc chloride is finally obtained as an aqueous solution. On a large scale its disposal would constitute a difficult and serious problem since the regeneration of the zinc or the recovery of the contained halogen is not practicable, at least not at the present time. The reaction has the additional disadvantage of being carried out under pressure, in the liquid phase.

It is known also that halogens can be removed from halogenated organic compounds in the presence of hydrogen and this reaction has been applied as a quantitative procedure for the determination of the amount of halogen present. Sabatier and Maihle have described (Comptes rendu (1904), vol. 138; 407) the reaction of hexachloroethane and hydrogen over a nickel catalyst with the formation of perchloroethylene and hydrogen chloride.

More recently, the use of copper and iron as catalysts, has been suggested (U. S. Patent 2,504,- 919) in the reaction of polychlorohydrocarbons and hydrogen to form olefines. In acknowledging prior art, the patent stated that haloolefines such as cis- and transdichloroethylenes have been prepared previously by the vapor phase reaction of hydrogen with polyhalohydrocarbons using iron filings but went on to point out that with nickel the conversions have been poor while with iron the yields have been poor and the process generally unsatisfactory.

The present improvement is based on my discovery that chlorotrifluoroethylene can be produced in relatively good yields and efficiencies by removing chlorine preferentially from 1,1,2-trichloro-1,2,2-trifluoroethane in the presence of hydrogen over a supported nickel catalyst. Hydrogen chloride is formed along with the main product. The reaction is illustrated by the following equation:

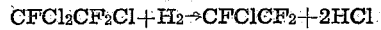

$$CFCl_2CF_2Cl + H_2 \rightarrow CFClCF_2 + 2HCl$$

The reaction is carried out by passing a mixture of 1,1,2-trichloro-1,2,2-trifluoroethane and hydrogen through a reactor or converter maintained at an elevated temperature. The reactor can be a length of tube made of nickel or of stainless steel, for instance, charged with the catalyst as hereinafter described. Known expedients can be employed for heating the reactor and maintaining it at a desired temperature, as for instance, an electrical resistance, or a salt bath in which the reactor is immersed. The vapors issuing from the reactor are collected by cooling and condensation, if desired, after having first been washed to remove the hydrogen halide, and dried; or by other suitable expedient.

Preferably, the catalyst support is barium phosphate, calcium phosphate, or calcium fluoride phosphate. The supported catalysts can be prepared by coprecipitation of the phosphates of nickel and calcium or nickel and barium from solutions of soluble salts of these metals, as for instance by pouring dilute aqueous ammonium hydroxide and a solution of nickel chloride and barium chloride acidified with phosphoric acid simultaneously into water. The rates of addition of the two solutions should be so adjusted relative to each other that the precipitation takes place under substantially neutral conditions. By the term substantially neutral conditions is meant a pH in the range of about 6.0 to 8.5. The coprecipitated salts are then washed, dried and screened to a fine powder. My supported catalyst is best used in the form of small pellets, as for instance, in the form of small cylinders, about $\tfrac{3}{16}$-inch in diameter by $\tfrac{3}{16}$-inch long. In pelleting the coprecipitated salts are mixed with a small amount of graphite, of the order of about 2 parts per 100 parts of the precipitated salts. A small amount of powdered chromic oxide may also be added, if desired, at the time the catalyst is pelleted, of the order of about one part per 100 parts of the precipitated salts. The presence of chromic oxide in the catalyst is not necessary, however. The graphite is subsequently oxidized prior to use of the catalyst.

Prior to putting the pellets into use for producing chlorotrifluoroethylene, the graphite is removed by oxidation with air at an elevated temperature of about 600° C. in the presence of steam. After purging the carbon-free catalyst with nitrogen with the temperature reduced to about 430° C. to 450° C., hydrogen is passed over the catalyst to reduce the nickel compound to metallic nickel.

Without desiring to be bound by any particular theory of catalytic operation, it is believed that it is the metallic form of nickel which is active. The nickel phosphate is presumably reduced to the free metal, at least on the surface of the catalyst pellets, during treatment with hydrogen prior to initiating the formation of chlorotrifluoroethylene. Further evidence that the metal is the active form of the catalyst is to be found in the fact that increased activity of the catalyst is observed after allowing a slow stream of hydrogen to flow over it during shutdown periods, as for instance during an overnight shut-down following a period of operation. This increase in activity is attributable, it is believed, to at least a partial reduction of accumulated nickel halides to the free metal.

In producing chlorotrifluoroethylene from 1,1,2-trichloro-1,2,2-trifluoroethane over my supported nickel catalyst in the presence of hydrogen, the ratio of hydrogen to the trichlorotrifluoroethane is not narrowly critical. At a ratio of 0.75 mole of hydrogen per mole of the trichlorotrifluoroethane, it is possible to react practically all of the hydrogen, thereby facilitating recovery of the chlorotrifluoroethylene and unreacted trichlorotrifluoroethane. Increasing the proportion of hydrogen increases the yield of chlorotrifluoroethylene but the losses to carbon and trifluoroethylene also increase. A ratio of from 0.75 to 3 moles of hydrogen per mole of 1,1,2-trichloro-1,2,2-trifluoroethane is preferred.

The actual mechanism of the dechlorination is not known. As pointed out above, it may be that the nickel functions as a catalyst by reacting to form the metal chloride which then reacts with the hydrogen to give hydrogen chloride, with the free metal being regenerated and the cycle repeated. Appreciable removal of chlorine is effected at temperatures as low as 200° C. but at this temperature the reduction of nickel halide is very slow so that the metallic nickel catalyst tends to be converted to the less active nickel chloride and fluoride. Temperatures in the range from 400° C. to 475° C. are preferred. Usable temperatures range up to 525° C. but at temperatures above 475° C. the reaction tends to become less efficient due to lessened selectivity in removing chlorine preferentially, and a somewhat shorter contact time than that used at lower temperatures is recommended.

Also, losses to carbon and trifluoroethylene can be minimized by using lower temperatures to effect lower single pass yields. Under such conditions, however, any mechanical losses are greatly magnified in terms of decreased efficiencies. Hence, precautions are required to minimize mechanical losses. In general, the optimum efficiencies are obtained when the single pass yields are in the range of 20 to 40 per cent, based on the 1,1,2-trichloro-1,2,2-trifluoroethane.

My supported nickel catalyst exhibits a high initial activity which falls off rapidly during operating periods of two to three hours, and the activity then declines much more gradually over subsequent periods of fifteen to thirty hours. A possible explanation of the initial rapid decline is the partial conversion of metallic nickel to a mixture of nickel chlorides and fluorides. The subsequent slow falling-off of activity is quite likely due to an accumulation of polymeric material or of free carbon or both on the surface of the catalyst. At the end of a run such deposits can be removed by oxidation with air at temperatures in the range of about 450° C. to 600° C. The resulting oxidized catalyst is then reduced with hydrogen at about the temperature at which it is to be used for the production of chlorotrifluoroethylene. This oxidation and reduction treatment results in the restoration of a "spent catalyst" to approximately its initial activity.

According to my studies, the maximum time that it has been possible to obtain economical conversions of 1,1,2-trichloro-1,2,2-trifluoroethane to chlorotrifluoroethylene with supported catalysts before reactivation is required is about thirty-five hours operation. Also, according to my studies, another material which has sufficient stability to the coproduct hydrogen chloride and side-reaction product hydrogen fluoride at the operating temperatures necessarily employed is activated carbon. My supported catalyst is not only stable to hydrogen chloride and hydrogen fluoride under reaction conditions, but has the additional advantage as compared to an activated carbon support, that the carbonaceous deposits which invariably form on the catalyst surface during operation can be removed by air oxidation. The ability of my supported catalyst to withstand repeated reactivations is especially important in the production of chlorotrifluoroethylene commercially in large scale reactors.

Granular refractory materials such as pumice, silica gel, alumina gel, porcelain or fire brick, and the like, are not suitable as catalyst supports in my process. With the exception of alumina gel, all of the above-named materials contain silica which is attacked by hydrogen fluoride. While it is true that the amount of hydrogen fluoride that is formed in the conversion of 1,1,2-trichloro-1,2,2-trifluoroethane to chlorotrifluoroethylene is small, it is also true nevertheless that this small amount attacks the silica-containing supports, with consequent disintegration.

Also, use of fused aluminum oxide (Aloxite) as a support results in low yields and efficiencies. One possible explanation is the effect of the surface characteristics of this support on the reaction but it is also to be borne in mind that there also could be formed some aluminum chloride. Aluminum chloride is known to effect the replacement of fluorine with chlorine and also to bring about rearrangements and disproportionations.

The improvement is further illustrated by the six examples which follow.

EXAMPLE 1

Eighty grams (0.33 mole) of nickel chloride hexahydrate ($NiCl_2 + 6H_2O$); 704 grams (2.9 moles) of barium chloride dihydrate ($BaCl_2 + 2H_2O$)

and 254 grams of aqueous (85 per cent) phosphoric acid (2.2 moles) dissolved in sufficient water to make 6 liters of solution was poured into 0.9 liter of water simultaneously with 2.4 liters of dilute aqueous ammonia containing 120 grams (7.1 moles) of $NH_3$. The solutions were mixed gradually over a three-hour period, and the pH of the resulting mixture was maintained in the range of 6.0 to 8.5 during the period by adjusting the relative rates of addition of the two solutions. Nickel and barium salts were coprecipitated, and the volume of these coprecipitated salts after a settling period of one hour was 2.5 liters. This precipitate was washed with water seven times by decantation using a volume ratio of water to settled precipitate of about 5 to 1. After filtering and drying overnight at a temperature of 85° C., there was obtained 515 grams of mixed barium and nickel phosphates. This material was passed through a screen having 35 meshes to the inch (opening, 0.417 millimeter), next mixed with 5.0 grams (1 per cent) of powdered chromic oxide ($Cr_2O_3$) and 10.0 grams (2 per cent) of powdered graphite and then formed into pellets, $\frac{1}{8}$ inch by $\frac{1}{8}$ inch.

A 0.25 liter sample of the pelleted catalyst was charged to the middle section of a reactor. The reactor was a nickel pipe, four feet in length, having an inside diameter of one inch and provided with a jacket for heating through the use of a salt bath therein. A preheater section comprising about 18 inches of coiled nickel screen was provided at the upper end of the pipe, and the bottom of the catalyst bed was supported on a nickel ring positioned about 14 inches above the bottom of the jacketed part of the tube. Initially, the catalyst was heated at a temperature that was gradually increased at the rate of 50° C. per hour until an end temperature of 600° C. was reached. Air and steam were then introduced at a rate of 13 liters per hour and 200 grams per hour, respectively, for the purpose of removing from the catalyst, by oxidation in the presence of steam, the carbon originally incorporated in the catalyst in the form of graphite. As the oxidation proceeded, the air feed was gradually increased to a final rate of 46 liters per hour. After all the carbon had been removed, the reactor was purged with nitrogen and the temperature allowed to decrease to a range of about 430° C. to 450° C. While the temperature was maintained within this range, hydrogen was passed into the reactor for a period of 1.5 hours at a rate of 118 liters per hour.

EXAMPLE 2

Chlorotrifluoroethylene was produced by passing 1,1,2-trichloro-1,2,2-trifluoroethane in contact with the catalyst of Example 1 in the presence of hydrogen and at a reaction temperature maintained at 448° C. to 454° C. The initial activity of the catalyst was very high and in order partly to compensate for this high activity, the trichlorotrifluoroethane was fed at a high space velocity which, it was estimated, would give approximately a 25 to 30 per cent conversion to chlorotrifluoroethylene. The initial feed rates were 740 grams of the trichlorotrifluoroethane and 118 liters of hydrogen, per hour, which were maintained for a period of 3.5 hours. Thereafter, and until the reaction was stopped for reactivation of the catalyst, the rates were maintained at 383 grams of trichlorotrifluoroethane and 59 liters of hydrogen per hour. During the first 3.5 hours of operation there was produced 2,254 grams of a washed crude material. Upon distillation of this material, there was obtained 388 grams of chlorotrifluoroethylene, corresponding to a yield of 24.1 per cent and an efficiency of 78.8 per cent. After the catalyst had been in service 15 hours, a succeeding period of operation of 5.5 hours gave 309 grams of chlorotrifluoroethylene which corresponded to a yield of 23.4 per cent and an efficiency of 77.6 per cent.

EXAMPLE 3

Subsequent to the run of Example 2, the catalyst was reactivated by oxidation with air followed by reduction with hydrogen as described for the initial preparation of the catalyst in Example 1. Feeding 781 grams per hour of 1,1,2-trichloro-1,2,2-trifluoroethane together with 118 liters per hour of hydrogen over the reactivated catalyst, maintained at a temperature of 449° C. to 453° C. gave 1622 grams of organic products and 254 grams (6.9 moles) of coproduct hydrogen halide over a reaction period of 2.5 hours. Upon distillation of the organic products, there was obtained 357 grams (3.1 moles) of chlorotrifluoroethylene and 1216 grams (6.5 moles) of unreacted trichlorotrifluoroethane. The yield and efficiency to chlorotrifluoroethylene were calculated to be 29.4 per cent and 78 per cent, respectively. The catalyst pellets after a total "on stream" time of 32.5 hours were still hard and in excellent condition for continued use.

EXAMPLE 4

One hundred sixty grams (0.67 mole) of nickel chloride hexahydrate ($NiCl_2+6H_2O$), 595 grams (5.4 moles) of calcium chloride and 53 grams (0.46 mole) of aqueous (85 per cent) orthophosphoric acid dissolved in sufficient water to make up 5.8 liters of solution was poured into 0.9 liter of water simultaneously with 2.7 liters of a solution containing 135 grams (2.2 moles) of aqueous ammonium hydroxide (28 per cent) and 1008 grams (10.7 moles) of potassium fluoride dihydrate ($KCl+2H_2O$). The pH of the resulting slurry was maintained in the range of 6.0 to 8.0 by adjusting the relative rates of addition of the two solutions, and by adding in two portions an additional 75 grams (1.2 moles) of aqueous ammonium hydroxide (28 per cent). A period of 2.3 hours was required to complete the mixing. The precipitate, after washing by decantation, filtering and drying, weighed 435 grams. It was pulverized, passed through a 35 mesh screen and mixed with 4.5 grams (1 per cent) of chromium oxide and 9.0 grams (2 per cent) of graphite as a lubricant to facilitate pelleting. The resulting mixture was then pelleted.

A 0.25 liter (220 grams) sample of the catalyst of Example 4 was charged to the salt-bath jacketed reactor described in Example 2. The contained graphite which was added to facilitate pelleting was removed by oxidation in air at a temperature which ranged from 260° C. to 648° C. The air feed rate which was 25 liters at the start was increased gradually to a final rate of 75 liters per hour. After the oxidation treatment was completed, air was purged from the reactor with nitrogen and the reactor allowed to cool down to a temperature of 425° C. to 450° C. Hydrogen was then passed through the reactor at this temperature at the rate of 118 liters per hour for a period of 3.7 hours to reduce the catalyst.

EXAMPLE 5

The catalyst of Example 4 exhibited a high initial activity similar to that observed with the catalyst of Example 2. Upon feeding 1,1,2-trichloro-1,2,2-trifluoroethane at the rate of 753 grams per hour together with 118 liters per hour of hydrogen over the catalyst maintained at a temperature of 447° C. to 453° C., there was obtained, over a 2.5 period, 395 grams of chlorotrifluoroethylene, corresponding to a yield of 33.7 per cent, with an efficiency of 80 per cent based on the trichlorotrifluoroethane.

EXAMPLE 6

At the end of the 2.5-hour run of Example 5, the feed rate of the trichlorotrifluoroethane was reduced by half to a rate of 382 grams per hour. There was produced 245 grams of chlorotrifluoroethylene corresponding to a yield of 26 per cent. The catalyst was then restored to essentially its initial activity by oxidation with air followed by reduction with hydrogen. Using about the same feed rates as were employed for a 3.5-hour period in Example 2, there was obtained 366 grams of chlorotrifluoroethylene over an operating period of 2.5 hours, corresponding to a yield of 31 per cent.

The nature and extent of the foregoing improvement is further illustrated by way of contrast by the following Experiments A, B and C which form no part of the present improvement. According to my studies set forth in Experiment A, a copper catalyst made by coprecipitation of copper and calcium phosphates is inferior to my catalyst in that maximum observed efficiency of the former was only 74 per cent, and fell off at the end of 7.5 hours' use to 64 per cent. Production ratios were also lower.

According to my studies set forth in Experiment B, the iron catalyst supported on activated carbon was very ineffective.

Also according to my studies set forth in Experiment C, the yields and efficiencies obtainable with Raney nickel pellets were almost as high as those obtainable with my supported nickel catalyst. The big disadvantage was that the pellets disintegrated with resultant excessive back pressure after about fourteen hours of service.

EXPERIMENT A

Part 1

Calcium phosphate and copper phosphate were coprecipitated by adding an aqueous solution of the chlorides of the metals simultaneously with 2.9 liters of a 3.1 normal aqueous ammonium hydroxide solution to a liter of water over a period of 1.4 hours. The solution of metal chlorides contained 486.5 grams (3.31 moles) of calcium chloride dihydrate, 51.2 grams (0.381 mole) of cupric chloride, and 292 grams of aqueous (85 per cent) phosphoric acid (2.54 moles) in a total volume of 7.0 liters of solution. During the addition, the pH of the mixture was maintained in the range of 6.0 to 7.0 by adjustment of the rates of addition of the two solutions relative to each other. The precipitate that was formed was allowed to settle by standing overnight. The settled precipitate which occupied 7 liters was washed by decantation nine times using 10 to 13 liters of distilled water each time, and then dried at a temperature of 140° C. The dried coprecipitated phosphates amounting to 392 grams were passed through a 35-mesh screen mixed with 9.8 grams (2.5 per cent by weight) of powdered graphite, and compressed into pellets which were approximately $\frac{3}{16}$-inch by $\frac{3}{16}$-inch.

The pelleted catalyst having a volume of about 0.25 liter, was charged into a reactor which was a nickel tube (one-inch inside diameter) provided with a salt bath heater. The graphite was oxidized by passing 10 liters of air over the catalyst in a period of one hour while the catalyst was heated from 310° C. to 436° C. Thereafter, the air feed was maintained at a rate of 30 liters per hour for a period of 2.2 hours while the temperature was gradually increased from 436° C. to an end temperature of 535° C. At the end of the 2.2 hour period, the oxidized catalyst was purged with nitrogen and allowed to cool to 480° C. The catalyst was next reduced by passing hydrogen over it at a rate of 118 liters per hour for a period of 1.7 hours while the temperature was maintained at 460° C. to 490° C.

Part 2

Chlorotrifluoroethylene was produced by feeding 1,1,2-trichloro-1,2,2-trifluoroethane and hydrogen over the catalyst of Experiment A, Part 1, at the rates of 770 grams per hour and 118 liters per hour, respectively, for a period of 2.0 hours while the catalyst was maintained at a temperature of 447° C. to 452° C. There was obtained 1308 grams of organic condensate which yielded, upon distillation, 224 grams of chlorotrifluoroethylene together with 6 grams of trifluoroethylene and 1052 grams of unreacted trichlorofluoroethane. There was also another fraction of 26 grams which was not credited to the above amounts. The yield and efficiency to chlorotrifluoroethylene were 23.5 per cent and 74 per cent, respectively.

Part 3

Following the run described in Part 2 of Experiment A, intermittent operations were continued with the catalyst for a period of 5.5 hours. For the last 5.5 hours, the feed rates were reduced to one-half of those employed in Part 2. The yield and efficiency for the final 3.5 hours were 18 per cent and 64 per cent, respectively. Thus, the efficiency using the supported copper catalyst of this experiment which was initially below that obtainable with my supported nickel catalyst dropped further to 64 per cent after only a few hours of service.

EXPERIMENT B

A solution containing 33 grams of ferric chloride, 50 grams of aqueous hydrochloric acid (37 per cent, hydrogen chloride), and 87 milliliters of water was evaporated to dryness on 0.3 liter of activated carbon passing a screen having 4 meshes per inch and being retained on a screen having 6 meshes per inch. The resulting catalyst of ferric chloride on an activated carbon support amounting to 0.2 liter (155 grams) was charged to a reactor which was a three-foot length of stainless steel tube (one inch, inside diameter) provided with resistance windings for direct heat. The preheater and discharge end sections of the tube were packed with carbon rings. 1,1,2-trichloro-1,2,2-trifluoroethane and hydrogen were fed over this catalyst for a period of 4.5 hours at an average rate of 400 grams of the trichlorotrifluoroethane and 83 liters of hydrogen per hour. The catalyst temperature at the start was 410° C. and during the course of the reaction it was increased gradually to a final temperature of 440° C. to 460° C. There was obtained 1499 grams of condensate which on distillation gave only 15 grams of material boiling in the range of chlorotrifluoroethylene, corresponding to a yield of 1.3 per cent which was practically negligible as compared to those obtained with my supported nickel catalyst.

EXPERIMENT C

One-half liter (943 grams) of Raney nickel pellets ($\frac{3}{16}$-inch by $\frac{3}{16}$-inch) was charged to a reactor which was a seven-foot length of nickel tubing (one inch, inside diameter) provided with a salt-bath heating jacket. The portions of the tube preceding and following the Raney nickel catalyst were packed with solid nickel pellets. After a preliminary 3-hour trial run or experiment under conditions similar to those described below, 2554 grams (13.62 moles) of 1,1,2-trichloro-1,2,2-trifluoroethylene and 425 liters of hydrogen were fed over the catalyst during a period of 3.5 hours. The catalyst was maintained at a temperature of 400° C. to 410° C. There was collected 1959 grams of condensate which on distillation gave 504 grams (4.33 moles) of chlorotrifluoroethylene, 11.5 grams (0.14 mole) of trifluoroethylene, and 1436 grams (7.65 moles) of unreacted trichlorotrifluoroethane. By-product halogen acid amounting to 16.2 moles was collected in a water scrubber. The yield and efficiency to chlorotrifluoroethylene were calculated to be about 32 per cent and 73 per cent, respectively.

It is to be noted that the efficiency is inferior to the efficiencies of 78 to 80 per cent obtainable with my supported nickel catalyst. A more serious disadvantage was the disintegration of the nickel pellets after about 14 hours of operation. The disintegration took place to such an extent that excessive back pressure developed through the catalyst bed preventing further operation.

This application is in part a continuation of my application Serial No. 209,196, filed February 2, 1951.

What is claimed is:

1. A process for making chlorotrifluoroethylene which comprises heating a mixture of 1,1,2-trichloro-1,2,2-trifluoroethane and hydrogen in the presence of a catalyst at a temperature of from 200° C. to 525° C., said catalyst being nickel supported on calcium phosphate.

2. A process for making chlorotrifluoroethylene which comprises heating a mixture of 1,1,2-trichloro-1,2,2-trifluoroethane and hydrogen in the presence of a catalyst at a temperature of from 200° C. to 525° C., said catalyst being nickel supported on barium phosphate.

3. A process for making chlorotrifluoroethylene which comprises heating a mixture of 1,1,2-trichloro-1,2,2-trifluoroethane and hydrogen in the presence of a catalyst at a temperature of from 200° C. to 525° C., said catalyst being nickel supported on calcium fluoride phosphate.

4. A process for making chlorotrifluoroethylene which comprises heating a mixture of 1,1,2-trichloro-1,2,2-trifluoroethane and hydrogen in the presence of a catalyst at a temperature of from 400° C. to 475° C., said catalyst being nickel supported on calcium phosphate.

5. A process for making chlorotrifluoroethylene which comprises heating a mixture of 1,1,2-trichloro-1,2,2-trifluoroethane and hydrogen in the presence of a catalyst at a temperature of from 400° C. to 475° C., said catalyst being nickel supported on barium phosphate.

6. A process for making chlorotrifluoroethylene which comprises heating a mixture of 1,1,2-trichloro-1,2,2-trifluoroethane and hydrogen in the presence of a catalyst at a temperature of from 400° C. to 475° C., said catalyst being nickel supported on calcium fluoride phosphate.

7. A process for making chlorotrifluoroethylene which comprises heating a mixture of 1,1,2-trichloro-1,2,2-trifluoroethane and hydrogen in the presence of a catalyst at a temperature of from 200° C. to 525° C., said catalyst being nickel supported on one of the group consisting of calcium and barium phosphates and calcium fluoride phosphate.

8. A process for making chlorotrifluoroethylene which comprises heating a mixture of 1,1,2-trichloro-1,2,2-trifluoroethane and hydrogen in a ratio of from 0.75 to 3 moles of hydrogen per mole of the 1,1,2-trichloro-1,2,2-trifluoroethane in the presence of a catalyst at a temperature of from 200° C. to 525° C., said catalyst being nickel supported on one of the group consisting of calcium and barium phosphates and calcium fluoride phosphate.

9. A process for making chlorotrifluoroethylene which comprises heating a mixture of 1,1,2-trichloro-1,2,2-trifluoroethane and hydrogen in the presence of a catalyst at a temperature of from 400° C. to 475° C., said catalyst being nickel supported on one of the group consisting of calcium and barium phosphates and calcium fluoride phosphate.

10. A process for making chlorotrifluoroethylene which comprises heating a mixture of 1,1,2-trichloro-1,2,2-trifluoroethane and hydrogen in a ratio of from 0.75 to 3 moles of hydrogen per mole of the 1,1,2-trichloro-1,2,2-trifluoroethane in the presence of a catalyst at a temperature of from 200° C. to 525° C., said catalyst being nickel supported on one of the group consisting of calcium and barium phosphates and calcium fluoride phosphate.

No references cited.